United States Patent
Kim et al.

(10) Patent No.: US 9,520,126 B2
(45) Date of Patent: Dec. 13, 2016

(54) VOICE RECOGNITION SYSTEM FOR REPLACING SPECIFIC DOMAIN, MOBILE DEVICE AND METHOD THEREOF

(71) Applicant: ELECTRONICS AND TELECOMMUNICATIONS RESEARCH INSTITUTE, Daejeon (KR)

(72) Inventors: Seung Hi Kim, Daejeon (KR); Sang Hun Kim, Daejeon (KR); Ki Hyun Kim, Daejeon (KR); Sang Kyu Park, Daejeon (KR); Soo Jong Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/602,586

(22) Filed: Jan. 22, 2015

(65) Prior Publication Data

US 2015/0340028 A1    Nov. 26, 2015

(30) Foreign Application Priority Data

May 20, 2014 (KR) .................. 10-2014-0060580

(51) Int. Cl.
| | | |
|---|---|---|
| G10L 15/00 | (2013.01) | |
| G10L 15/08 | (2006.01) | |
| G10L 15/30 | (2013.01) | |
| G10L 15/22 | (2006.01) | |

(52) U.S. Cl.
CPC ............... *G10L 15/08* (2013.01); *G10L 15/30* (2013.01); *G10L 2015/088* (2013.01); *G10L 2015/228* (2013.01)

(58) Field of Classification Search
CPC ........ G10L 15/22; G10L 15/265; G06F 3/167; H04M 2201/40
USPC ........................................... 704/275
See application file for complete search history.

(56) References Cited

U.S. PATENT DOCUMENTS

| | | | | |
|---|---|---|---|---|
| 6,510,417 B1 * | 1/2003 | Woods | ............... | G10L 15/26 379/88.17 |
| 7,925,507 B2 * | 4/2011 | Weng | ............... | G06F 17/278 704/257 |
| 8,032,374 B2 | 10/2011 | Jeon et al. | | |
| 8,447,607 B2 * | 5/2013 | Weider | ............. | G06F 17/30864 704/250 |
| 8,473,299 B2 * | 6/2013 | Di Fabbrizio | ......... | G10L 15/28 704/270 |

(Continued)

FOREIGN PATENT DOCUMENTS

KR    10-2013-0026855    3/2013

*Primary Examiner* — Jesse Pullias
(74) *Attorney, Agent, or Firm* — Staas & Halsey LLP (57) ABSTRACT

A voice recognition system that divides a search space for voice recognition into a general domain search space and a specific domain search space. A mobile terminal receives a voice recognition target word from a user, and a voice recognition server divides a search space for voice recognition into a general domain search space and a specific domain search space and stores the spaces and performs voice recognition for the voice recognition target word through linkage of the general domain search space and the specific domain search space.

20 Claims, 7 Drawing Sheets

(56) References Cited

U.S. PATENT DOCUMENTS

| | | | |
|---|---|---|---|
| 8,566,102 B1 * | 10/2013 | Bangalore | G10L 15/22 704/270.1 |
| 2006/0080107 A1 * | 4/2006 | Hill | G10L 15/1822 704/275 |
| 2007/0219798 A1 * | 9/2007 | Wang | G10L 15/063 704/257 |
| 2013/0138441 A1 | 5/2013 | Kim et al. | |
| 2013/0297304 A1 | 11/2013 | Kim et al. | |

* cited by examiner

VOICE RECOGNITION SYSTEM FOR REPLACING SPECIFIC DOMAIN, MOBILE DEVICE AND METHOD THEREOF

CROSS-REFERENCE TO RELATED APPLICATIONS

This application claims priority to and the benefit of Korean Patent Application No. 10-2014-0060580 filed in the Korean Intellectual Property Office on May 20, 2014, the entire contents of which are incorporated herein by reference.

TECHNICAL FIELD

The present invention relates to a voice recognition system for replacing a specific domain, a mobile device, and a method thereof, and more particularly, to a technology that divides a search space for voice recognition into a general domain search space and a specific domain search space.

BACKGROUND ART

A general voice recognition system performs a search process of expressing a target domain to be recognized as one search space and searching a word string which is most similar to an input voice signal (voice data) under a condition of the corresponding search space. That is, the general voice recognition system provides a voice recognition service having the same single search space to all voice recognition service users.

When a universal single search space is integratedly provided as described above, it is difficult to provide a customized service suitable for a situation of a user and voice recognition accuracy is lowered under a specific situation.

SUMMARY OF THE INVENTION

The present invention has been made in an effort to provide a more accurate and differentiated voice recognition service by dividing a search space for voice recognition into a general domain and a specific domain and providing a specific domain search space together with a general domain search space according to a situation.

An exemplary embodiment of the present invention provides a voice recognition system, including: a mobile terminal receiving a voice recognition target word from a user; and a voice recognition server dividing a search space for voice recognition into a general domain search space and a specific domain search space and storing the spaces, and performing voice recognition for the voice recognition target word in link with the general domain search space and the specific domain search space.

The voice recognition server may include transition information to the specific domain search space in the general domain search space and decode the voice recognition target word by moving to a specific domain search space corresponding to the transition information when the transition information to the specific domains search space is reached while decoding the voice recognition target word in the general domain search space.

When a predetermined specific domain search space is selected by a user, the voice recognition server may perform the voice recognition for the voice recognition target word through linkage of the selected specific domain search space and the general domain search space when the selected specific domain search space is present, and perform the voice recognition for the voice recognition target word based on the created specific domain search space and the general domain search space by creating the specific domain search space when the selected specific domain search space is not present.

The voice recognition server may include a general domain search space part creating and storing a general domain search space based on general knowledge information of which a category is not specified; a specific domain search space part creating and storing a specific domain search space based on knowledge information in a specific category; and a voice recognition engine performing the voice recognition for the voice recognition target word based on the general domain search space part and the specific domain search space part.

The specific domain search space part may include a specific domain knowledge database storing knowledge information for creating the specific domain search space; a specific domain search space creation module creating the specific domain search space by using the specific domain knowledge database; and a specific domain search space database storing the specific domain search space created by the specific domain search space creation module.

The voice recognition server may judge whether the specific domain search space is charged and when the specific domain search space is charged, the voice recognition server provides the specific domain search space to the mobile terminal.

The system may further include a charging server charging the specific domain search space by a request from the voice recognition server.

The voice recognition server may create and store a plurality of specific domain search spaces for each specific category, the plurality of specific domain search spaces may share types of categories, and contents in the category may be configured to be different for each category of the plurality of specific domain search spaces.

Another exemplary embodiment of the present invention provides a voice recognition system, including: a mobile terminal dividing a search space for voice recognition into a general domain search space and a specific domain search space and performing voice recognition for a voice recognition target word through linkage of the general domain search space and the specific domain search space; and a voice recognition server creating and storing the specific domain search space by a request from the mobile terminal.

The mobile terminal may receive the voice recognition target word, and perform the voice recognition for the voice recognition target word based on the specific domain search space and the general domain search space when the specific domain search space is present and requests creating the specific domain search space to the voice recognition server to receive the created specific domain search space when the specific domain search space is not present.

The mobile terminal may include a general domain search space database storing a general domain search space based on general knowledge information of which a category is not specified; a specific domain search space database storing a specific domain search space based on knowledge information in a specific category; and a voice recognition engine performing the voice recognition of the voice recognition target word through linkage of the general domain search space database and the specific domain search space database.

The voice recognition server may include a general domain search space creation unit creating the general domain search space; and a specific domain search space creation unit creating the specific domain search space.

The mobile terminal may judge whether the specific domain search space is charged and when the specific domain search space is charged, the mobile terminal may load the specific domain search space.

The system may further include a charging server charging the specific domain search space by a request from the mobile terminal.

The mobile terminal may store a plurality of specific domain search spaces, the plurality of specific domain search spaces may share types of categories, and contents in the category may be configured to be different for each category of the plurality of specific domain search spaces.

Yet another exemplary embodiment of the present invention provides a mobile device, including: a general domain search space database storing a general domain search space based on general knowledge information of which a category is not specified; a specific domain search space database storing a specific domain search space based on knowledge information in a specific category; and a voice recognition engine performing the voice recognition of the voice recognition target word through linkage of the general domain search space database or the specific domain search space database.

Still another exemplary embodiment of the present invention provides a voice recognition method for replacing a specific domain, including: dividing a search space for voice recognition into a general domain search space and a specific domain search space and storing the spaces; receiving a voice recognition target word from a user; and performing the voice recognition of the voice recognition target word based on the general domain search space and the specific domain search space.

Still yet another exemplary embodiment of the present invention provides a voice recognition method for replacing a specific domain, including: dividing a search space for voice recognition into a general domain search space and a specific domain search space and storing the spaces; selecting, by a user, a specific domain search space; judging whether the specific domain search space selected by the user is stored; loading the specific domain search space selected by the user when the specific domain search space selected by the user is stored; creating the specific domain search space when the specific domain search space selected by the user is not stored; and performing voice recognition through linkage of the selected specific domain search space and the general domain search space.

In the dividing of a search space for voice recognition into a general domain search space and a specific domain search space and the storing of the spaces, transition information to the specific domain search space is included and stored in the general domain search space, and in the performing of the voice recognition, the voice recognition target word is decoded by moving to a specific domain search space corresponding to the transition information when the transition information to the specific domains search space is reached while decoding the voice recognition target word in the general domain search space.

The method may further include, after the selecting, by the user, of the specific domain search space, judging whether the specific domain search space is charged, wherein, in the judging of whether the specific domain search space is charged, the specific domain search space may be provided when the specific domain search space is charged.

According to exemplary embodiments of the present invention, a search space of a voice recognition device is divided into a general domain search space and a specific domain search space for each specific domain and a specific domain search space is provided while being replaced together with a general domain search space according to a situation to improve the quality of a voice recognition service and increase efficiency in terms of the size of the search space.

The technology can create profits of a company that provides the voice recognition service by charging the specific domain search space.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, for detailed description so as for those skilled in the art to easily carry out the technical spirit of the present invention, exemplary embodiments of the present invention will be described with reference to the accompanying drawings. First, in addition of reference numerals to constituent elements of each drawing, it should be noted that like reference numerals are used for like and corresponding parts even though the parts are illustrated in the different drawings. When it is judged that specific description on known configurations or functions related in the description of the present disclosure may unnecessarily obscure the essentials of the present disclosure, the detailed description will be omitted. Hereinafter, exemplary embodiment of the present disclosure will be described. However, it should be understood that a technical spirit of the invention is not limited to the specific embodiments, but may be changed or modified by those skilled in the art.

The present invention as technology regarding a voice recognition device that operates in a PC or a mobile device is technology that divides a search space for voice recognition into a general domain search space and a specific domain search space and performs the voice recognition by variously using the general domain search space and the specific domain search space depending on a situation to improve voice recognition efficiency. Herein, the search space is a database referred during the voice recognition and knowledges associated with the voice recognition are expressed as a network. A voice recognition engine searches a path on the network, which is most suitable for an input voice and outputs the searched path as a voice recognition result. A specific domain means a domain including contents on a specific category and a general domain means not the specific category but a domain including general contents. Herein, the category means a set of words, phrases, or sentences having the same property.

Hereinafter, exemplary embodiments of the present invention will be described in detail with reference to FIGS. 1 to 7.

Figure 1:
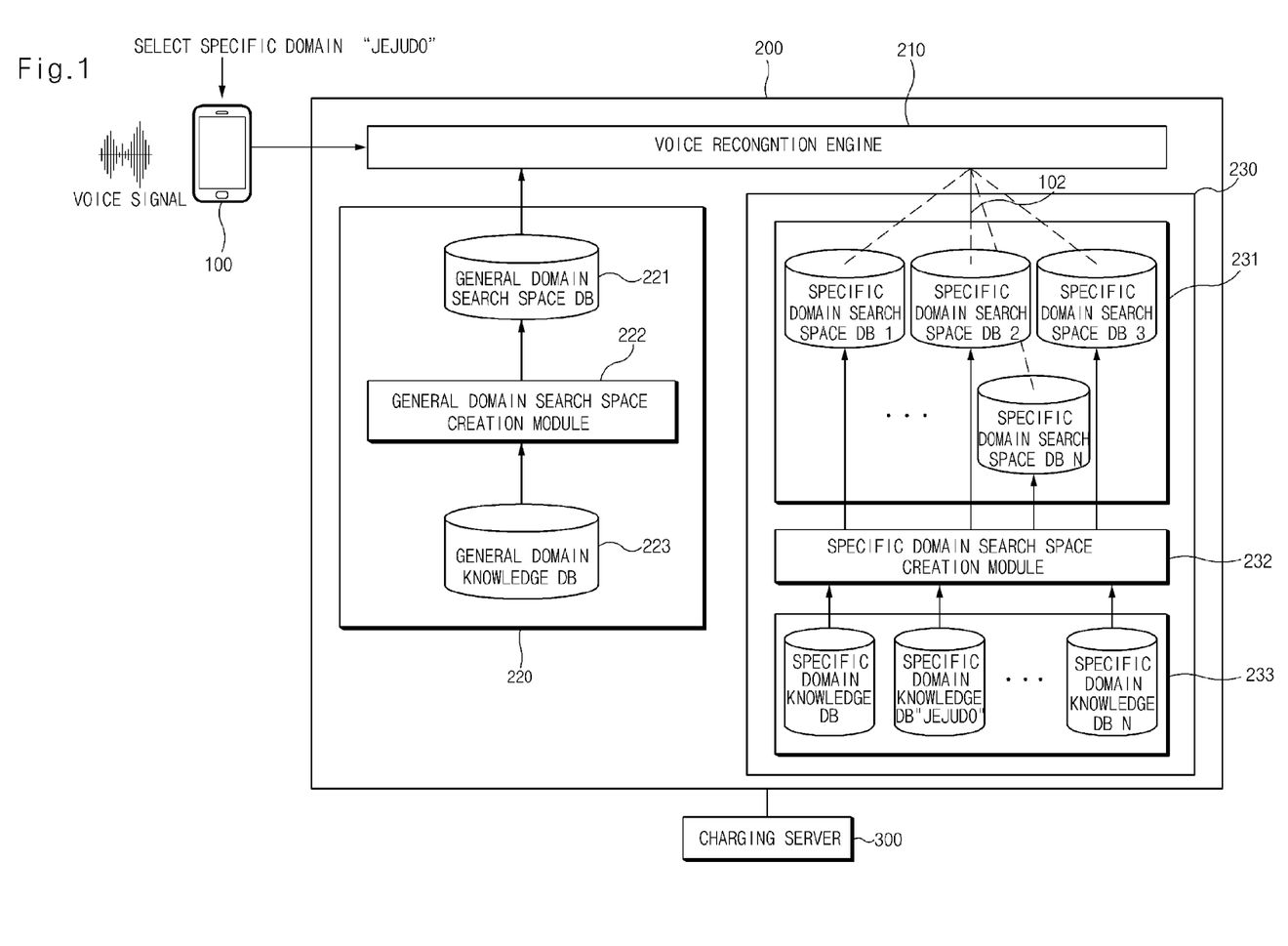
FIG. 1 is a configuration diagram of a voice recognition system according to an exemplary embodiment of the present invention.

FIG. 1 is a configuration diagram of a voice recognition system according to an exemplary embodiment of the present invention.

The voice recognition system according to the exemplary embodiment of the present invention includes a mobile terminal 100, a voice recognition server 200, and a charging server 300. In this case, the mobile terminal 100 performs wireless communication with the voice recognition server 200 or the charging server 300 and the voice recognition server 200 and the charging server 300 may be implemented to perform communication through a wired network.

The mobile terminal 100 as a mobile communication terminal that performs data communication and a voice call receives a specific domain selected by a user or receives a voice recognition target word for voice recognition to transmit the specific domain or voice recognition target word to the voice recognition server 200. The voice recognition server 200 includes a voice recognition engine 210, a general domain search space part 220, and a specific domain search space part 230.

When the voice recognition engine 210 receives a request for the voice recognition from the mobile terminal 100, the voice recognition engine 210 performs the voice recognition by using search spaces of the general domain search space part 220 and the specific domain search space part 230. That is, the voice recognition engine 210 performs the voice recognition in link with the general domain search space part 220 and the specific domain search space part 230 and provides an optimal voice recognition result in a result of performing the voice recognition to the user. A case in which the user inputs voice that "This is a house which is good at cooking Dombe meat which I like" will be described as an example. Since "I like" and "the house which is good at cooking" are combinations of generally used words, "I like" and "the house which is good at cooking" are included in a general domain search space. However, "the Dombe meat" local food of Jejudo and is not a word that is generally used. If the word "Dombe meat" is not included in the general domain search space or the specific domain search space, the word "Dombe meat" may not be recognized. When the word "Dombe meat" is included in the general domain search space, the word "Dombe meat" is recognizable, but when a word of which a use frequency is extremely low is included in the general domain search space, the efficiency of the search space significantly deteriorates. As a result, in the existing voice recognition method, the word "Dombe meat" is not included in a single search space, and as a result, the word "Dombe meat" may not be recognized. In the present invention, "the Dombe meat" may be included in the specific domain search space corresponding to Jejudo. In this case, since "I like" and "the house which is good at cooking" in the speech of the user are expressions included in the general domain search space and "the Dombe meat" is an expression included in the specific domain search space, when the general domain search space and the specific domain search space are linked with each other, "the house which is good at cooking the Dombe meat which I like" may be recognized.

In this case, the specific domain search space used by the voice recognition engine may be a search space corresponding to a specific domain selected by the user or may be a search space corresponding to a specific domain selected by other means.

The general domain search space part 220 creates and stores the general domain search space based on knowledge information for voice recognition of a vocabulary which is generally frequently used, not a specific category. To this end, the general domain search space part 220 includes a general domain search space DB 221, a general domain search space creation module 222, and a general domain knowledge DB 223.

The general domain search space DB 221 as a database which stores a general domain search space for voice recognition for expressions constituted by general vocabularies is a database that supports voice recognition for a speech of a type expressible by combinations of vocabularies which are generally frequently used. The general domain search space creation module 222 creates the general domain search space by using the general domain knowledge DB 223 and the general domain knowledge DB 223 is a database that has not knowledge information in the specific category but knowledge information for the voice recognition of the vocabularies which are generally used.

The specific domain search space part 230 creates and stores a specific domain search space part for a specific domain designated by the user or automatically specified. To this end, the specific domain search space part 230 includes a specific domain search space DB group 231, a specific domain search space creation module 232, and a specific domain knowledge DB group 233. The specific domain search space DB group 231 is a database that stores specific domain search spaces. The specific domain search space creation module 232 creates the specific domain search space by using knowledge information for the specific domain of the specific domain knowledge DB group 233. The specific domain knowledge DB group 233 stores knowledge information for searching the specific domain.

The charging server 300 performs charging of the specific domain search space in link with the voice recognition server 200. In this case, the charging server 300 is not linked with the voice recognition server 300 but directly linked with the mobile terminal 100 to perform the charging.

In the voice recognition system according to the exemplary embodiment of the present invention disclosed in FIG. 1, when the mobile terminal 100 receives a voice recognition target word from the user, the voice recognition server 200 performs the voice recognition based on the general domain search space and the specific domain search space for the corresponding voice recognition target word.

As described above, in the present invention, the search space for the voice recognition is divided into the general domain search space and the specific domain search space, a plurality of specific domain search spaces is created regardless of the general domain search space and thereafter, an appropriate specific domain search space suitable for the situation is selected from the plurality of specific domain search spaces to be replaced. In particular, since the specific domain search space is much smaller than the general domain search space, a search space construction time and a memory loading time are very short to provide a voice recognition service to the user in real time.

Figure 2:
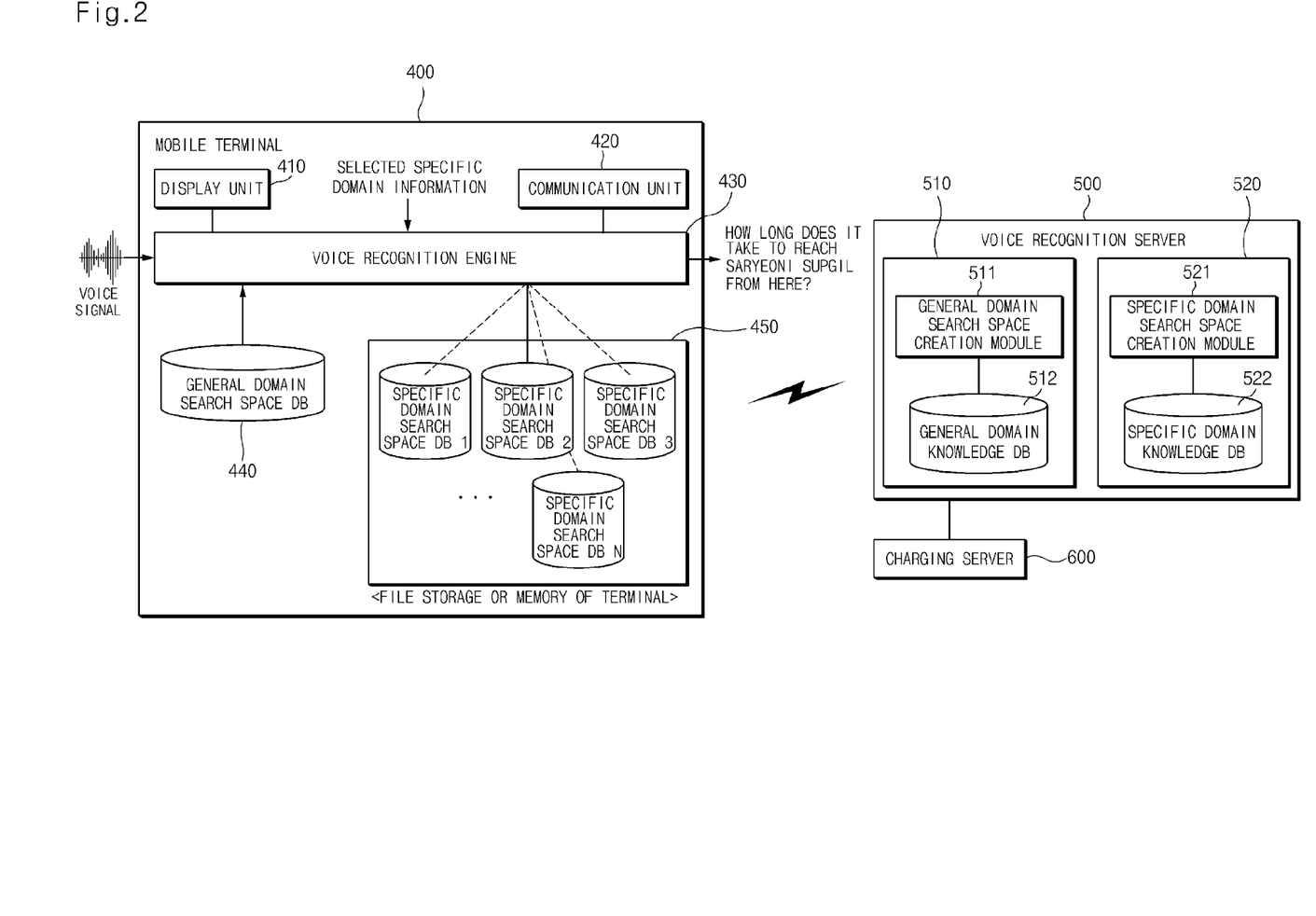
FIG. 2 is a configuration diagram of a voice recognition system according to another exemplary embodiment of the present invention.

FIG. 2 is a configuration diagram of a voice recognition system according to another exemplary embodiment of the present invention.

The voice recognition system according to another exemplary embodiment of the present invention includes a mobile terminal 400, a voice recognition server 500, and a charging server 600. The voice recognition system according to another exemplary embodiment of the present invention is configured in such a manner that a voice recognition engine 430, a general domain search space DB 440, and a specific domain search space DB group 450 are incorporated in the mobile terminal 400 and the specific domain search space is created through the voice recognition server 500. In this case, when even the specific domain search space creation module is incorporated in the mobile terminal 400, the size of the system may be increased and a driving capability may deteriorate, and as a result, the specific domain search space creation module is included in the external voice recognition server 500.

When the mobile terminal 400 calls and loads the general domain search space and the specific domain search space selected by the user and receives an input word such as a word or a sentence for the voice recognition from the user, the mobile terminal 400 performs the voice recognition of the input word by using the loaded general domain search space and specific domain search space. In this case, when the specific domain search space selected by the user is not present in the mobile terminal 400, the mobile terminal 400 requests creating the corresponding specific domain search space to the voice recognition server 500, and receives the created specific domain search space from the voice recognition server 500. In this case, the mobile terminal 400 preferably receives the corresponding specific domain search space in a WiFi space in which a communication fee is inexpensive, and the like, but the present invention is not limited thereto and the mobile terminal 400 may receive the corresponding specific domain search space anywhere such as a 3G network, and the like for user convenience.

To this end, the mobile terminal 400 includes a display unit 410, a communication unit 420, the voice recognition engine 430, the general domain specific domain DB 440, and the specific domain search space DB group 450.

The display unit 410 displays information required for the voice recognition, and displays the stored specific domain search space, the specific domain search space selected by the user, a voice recognition result, and the like.

The communication unit 420 may communicate with a base station (not illustrated) for mobile communication and perform wireless data communication with the voice recognition server 500 or the charging server 600.

The voice recognition engine 430 may recognize a meaning by receiving a voice signal and perform the voice recognition based on the general domain search space DB 440 and the specific domain search space DB 450.

The general domain search space DB 440 is a database for supporting the voice recognition for not contents in the specific category but the generally frequently used vocabulary.

The specific domain search space DB group 450 is a collection of databases automatically or selected by the user for a specific category for supporting the voice recognition for linguistic expressions associated with a specific category which may not be expressed by the general domain search space.

The voice recognition server 500 creates the general domain search space or the specific domain search space. To this end, the voice recognition server 500 includes a general domain search space creation unit 510 and a specific domain search space creation unit 520.

The general domain search space creation unit 510 includes a general domain search space creation module 511 and a general domain knowledge DB 512. The general domain search space creation module 511 creates the general domain search space by using the general domain knowledge DB 512 and the general domain knowledge DB 512 is a database that has knowledge information for the voice recognition of the vocabularies which are generally frequently used.

The specific domain search space creation unit 520 includes a specific domain search space creation module 521 and a specific domain search space knowledge DB 522. The specific domain search space creation module 521 creates the specific domain search space based on the specific domain search space knowledge DB 522 and the specific domain search space knowledge DB 522 is a database that stores knowledge information for creating the specific domain search space.

The charging server 600 performs charging of the specific domain search space in link with the voice recognition server 500. In this case, the charging server 600 is not linked with the voice recognition server 500 but directly linked with the mobile terminal 410 to perform the charging.

As described above, in the voice recognition system according to another exemplary embodiment of the present invention, expressions used for a general situation are included in the general domain search space and expressions used only for a specific situation are included in the specific domain search space which is much smaller than the general domain search space and the specific domain search spaces are incorporated in the mobile terminal to provide a more accurate voice recognition service for speeches in various specific situations.

When the specific domain search space is not stored in the mobile terminal 400, the specific domain search space may be created through the voice recognition server 500 and the created specific domain search space may be downloaded anytime under environments in which downloading is easy, such as a WiFi environment, and the like to provide a high-quality voice recognition service even under an environment in which the mobile communication is not supported.

Figure 3:
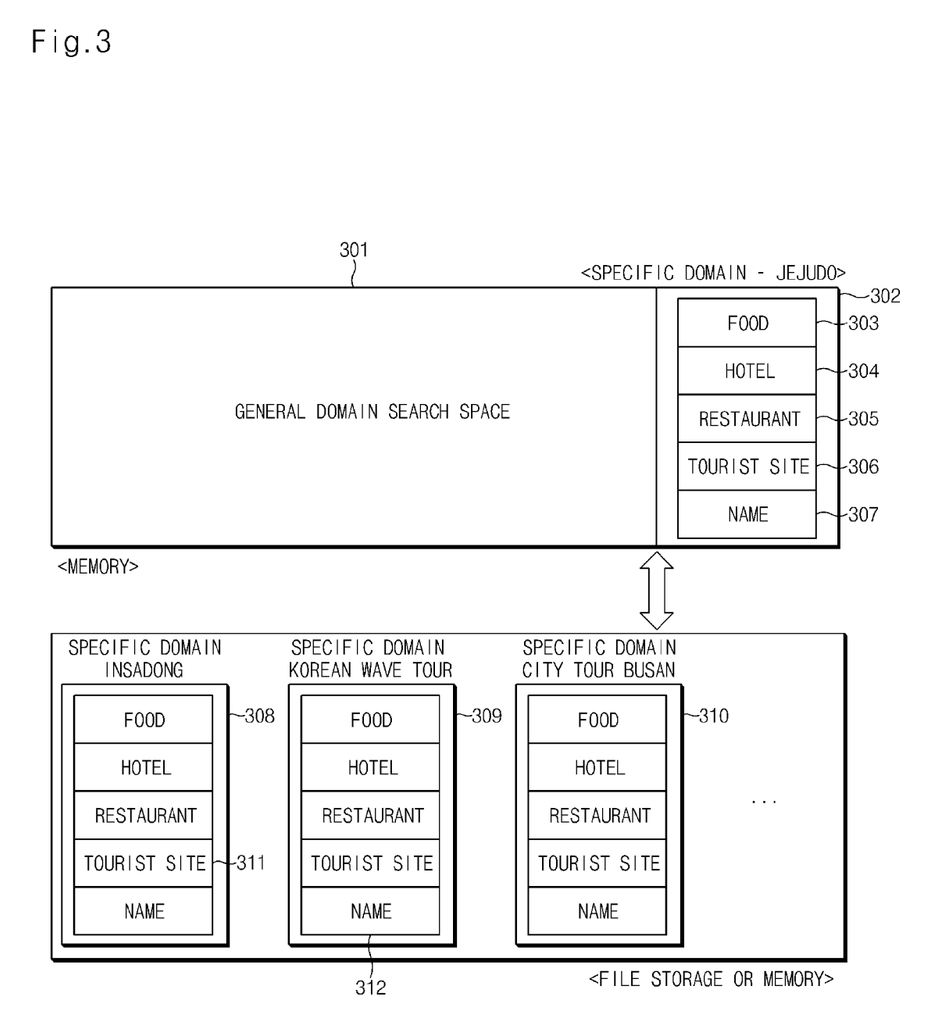
FIG. 3 is a configuration diagram of a search space according to the exemplary embodiment of the present invention.

FIG. 3 is a configuration diagram of a search space for voice recognition according to the exemplary embodiment of the present invention.

The search space according to the exemplary embodiment of the present invention is divided into a general domain search space 301 and a specific domain search space 302, and the general domain search space 301 and the specific domain search space 302 are independent from each other and share only a type of category. The type of the category for each specific domain is similar, but the contents of the category are different. The category means a set of words, phrases, or sentences having the same property. For example, Bulgogi, steak, hamburger, and the like may be included in a category of "food". Queen Seondeok, Kim Yu-sin, King Sejong, Jeong Yak-yong, and the like may be included in a category of "name".

For example, five categories including "food" 303, "hotel" 304, "restaurant" 305, "tourist site" 306, and "name" 307 are assumed as applied categories. A fact that the applied categories are five categories is maintained similarly in each search space, but the contents of the categories are different. Only types of five categories themselves are reflected to the general domain search space 301 and the specific domain search space 302 are constituted by the contents of five categories.

In this case, the contents of a "tourist site" category 311 of a specific domain "Insadong" 308 are different from those of the "tourist site" category 306 of the specific domain "Jejudo" 302. Names of tourist sites in the Insadong will be reflected in the "Insadong" 308 and names of tourist sites in the Jejudo will be reflected in the "Jejudo". For example, a tourist site called "Saryeoni Supgil" is present in the Jejudo. Since the "Saryeoni Supgil" is a vocabulary which is not generally used, the "Saryeoni Supgil" is not included in the general domain search space. It is assumed that a sentence "How long does it take to reach Saryeoni Supgil from here?" is spoken. When the "Jejudo" is not selected as the specific domain, the speech may not normally be recognized. However, if the "Jejudo' is selected, the speech may be normally recognized. Similarly, when names of various Korean wave stars are registered in the "name" category 312 in a specific domain "Korean wave tour" 309, a distinguished recognition service of only "the Korean wave tour" may be used at the time of selecting the "Korean wave tour" as the specific domain.

Figure 4:
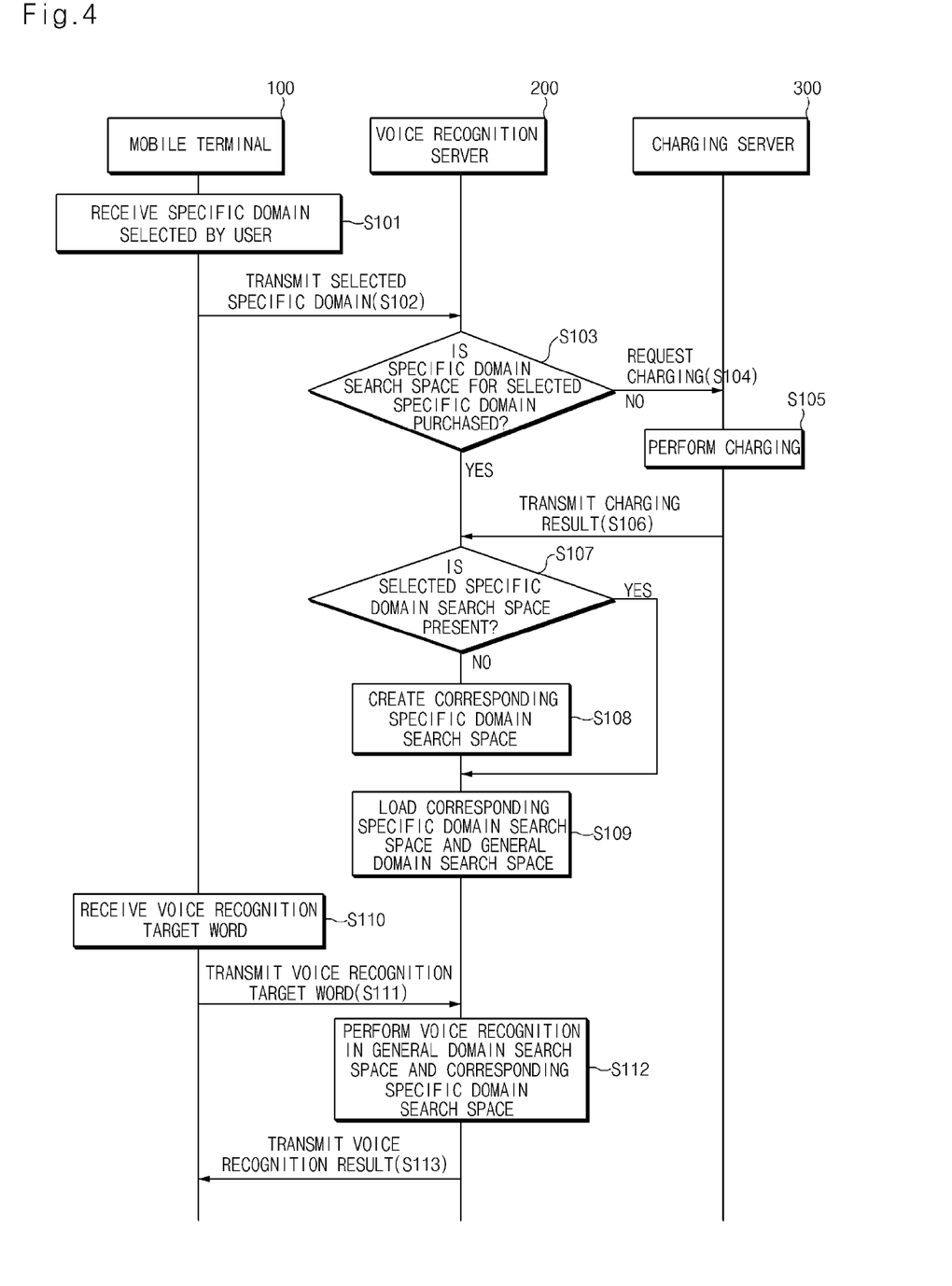
FIG. 4 is a flowchart illustrating a method for creating a specific domain search space for voice recognition according to an exemplary embodiment of the present invention.

Hereinafter, FIG. 4 is a flowchart illustrating a method for creating a specific domain search space for voice recognition according to an exemplary embodiment of the present invention. The voice recognition method according to the exemplary embodiment of the present invention is an example of the voice recognition method by the voice recognition system of FIG. 1.

First, the mobile terminal 100 receives the specific domain selected by the user (S101). In this case, the mobile terminal 100 may receive the specific domain through a touch, a keypad input, and the like on a screen. Thereafter, the mobile terminal 100 transmits information on the selected specific domain to the voice recognition server 200 (S102). The voice recognition server 200 judges whether the specific domain search space for the selected specific domain is purchased by performing charging (S103).

When the specific domain search space is not purchased, the voice recognition server 200 requests the charging to the charging server 300 (S104) and the charging server 300 performs the charging of the corresponding specific domain search space (S105).

The charging server 300 transmits a charging result to the voice recognition server 200 when the charging is completed (S106).

Therefore, the voice recognition server 200 verifies whether the corresponding specific domain search space is present in the specific domain search space DB group 231 (S107) and when the corresponding specific domain search space is present in the specific domain search space DB group 231, the voice recognition server 200 loads the general domain search space and the corresponding specific domain search space to a memory (S109).

Meanwhile, when the corresponding specific domain search space is not present in the specific domain search space DB group 231, the specific domain search space creation module 232 creates the specific domain search space by using the specific domain knowledge DB group 233 (S108). Thereafter, the created specific domain search space and general domain search space are together loaded to the memory (S109).

Thereafter, the mobile terminal 100 receives the voice recognition target word for the voice recognition (S110) and transmits the received voice recognition target word to the voice recognition server 200 (S111). Therefore, the voice recognition server 200 performs the voice recognition for the voice recognition target word based on the general domain search space and the corresponding specific domain search space (S112). In this case, the general domain search space is, in advance, created and stored and the specific domains search space may be created and purchased according to a request from the user.

Thereafter, the voice recognition server 200 transmits a voice recognition result to the mobile terminal 100 (S113) and the mobile terminal 100 displays the voice recognition result on the screen.

For example, when the user selects the "Jejudo" as the specific domain, the mobile terminal 100 transfers to the voice recognition server 200 the fact that the "Jejudo" is selected as the specific domain and the voice recognition server 200 verifies whether a space regarding the "Jejudo" is present in the specific domain search space and when the corresponding space is present in the specific domain search space, the voice recognition server 200 loads the corresponding "Jejudo" specific domain search space together with the general domain search space and when the corresponding space is not present, the voice recognition server 200 creates the "Jejudo" specific domain search space and thereafter, loads both the created specific domain search space and the general domain search space to the memory. Thereafter, when "How long does it take to reach Saryeoni Supgil from here?" is input as the voice recognition target word for the voice recognition through the mobile terminal 100, the voice recognition server 200 performs the voice recognition based on the general domain search space and the specific domain search space. "How long does it take to reach Saryeoni Supgil from here?" is a result recognized in the general domain search space and "Saryeoni Supgil" is a result recognized in the "Jejudo" specific domain search space. In this case, "Saryeoni Supgil" may be expressed only in the "Jejudo" search space but is not expressed in the general domain search space and is not expressed even in other specific domain search spaces. Accordingly, if the "Jejudo" specific domain is not selected, the "Saryeoni Supgil" may not be recognized, and the "Jejudo" specific domain search space is selected and recognition is performed to increase the voice recognition success rate.

Figure 5:
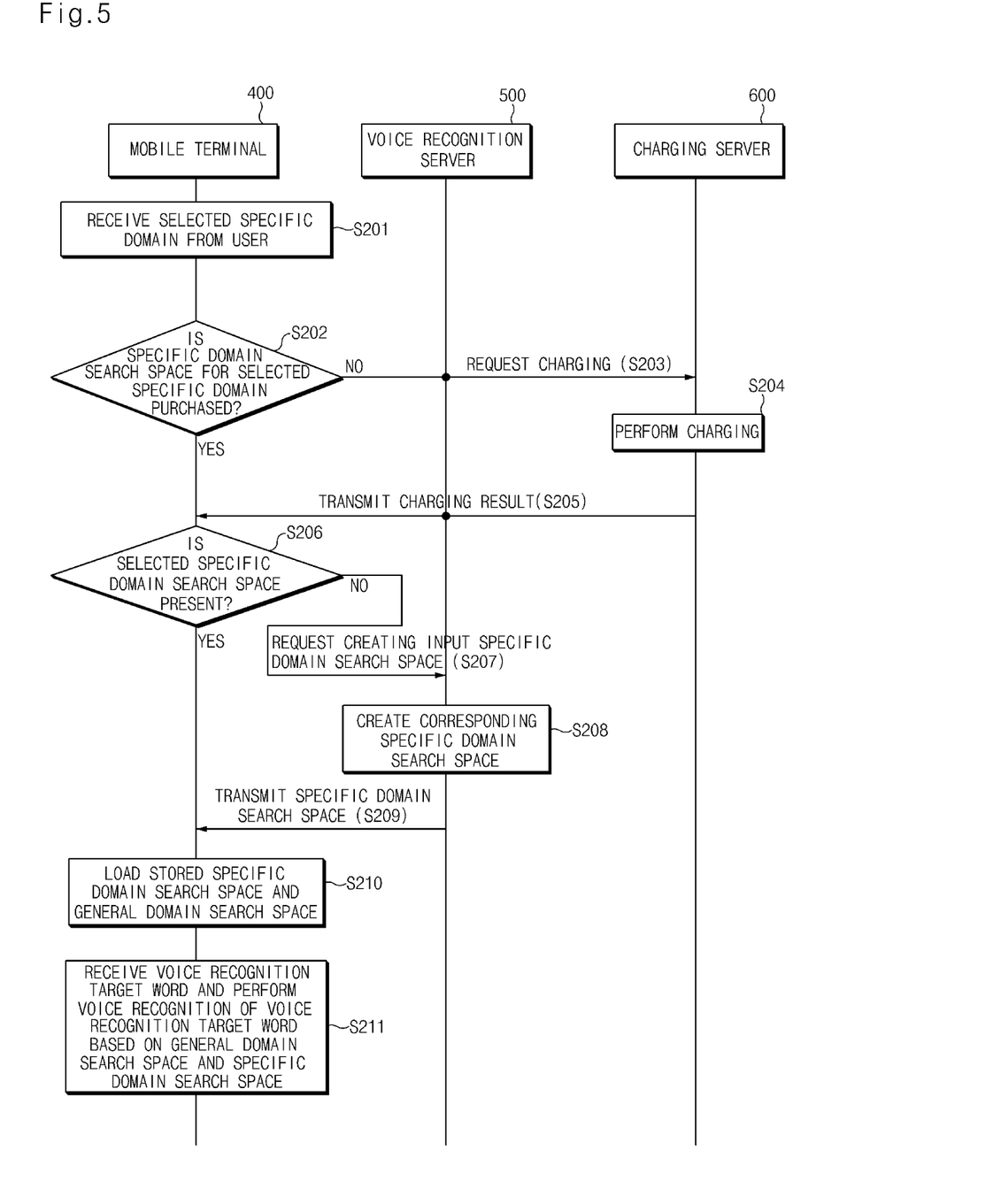
FIG. 5 is a flowchart illustrating a method for creating a specific domain search space for voice recognition according to another exemplary embodiment of the present invention.

Hereinafter, FIG. 5 is a flowchart illustrating a method for creating a specific domain search space for voice recognition according to another exemplary embodiment of the present invention. The voice recognition method according to another exemplary embodiment of the present invention is an example of the voice recognition method by the voice recognition system of FIG. 2.

First, the mobile terminal 400 receives the specific domain selected by the user (S201). In this case, the mobile terminal 400 may receive the specific domain through a touch, a keypad input, and the like on the screen.

Thereafter, the mobile terminal 400 verifies whether the specific domain search space for the input specific domain is purchased (S202) and when the specific domain search space for the input specific domain is not purchased, the mobile terminal 400 requests the charging to the charging server 600 (S203).

Therefore, the charging server 600 performs the charging for the corresponding specific domain search space (S204) and transmits the charging result to the mobile terminal 400 (S205). In this case, in FIG. 5, an example in which the mobile terminal 400 is linked with the charging server 600 through the voice recognition server 500 is disclosed, but the mobile terminal 400 may directly communicate with the charging server 600.

Thereafter, the mobile terminal 400 verifies whether the specific domain search space for the input specific domain is present in the specific domain search space DB group 450 (S206) and when the specific domain search space for the input specific domain is present in the specific domain search space DB group 450, the mobile terminal 400 loads the corresponding specific domain search space to a memory (not illustrated) (S210).

Meanwhile, when the specific domain search space for the input specific domain is not present in the specific domain search space DB group 450, the mobile terminal 400 requests creating the corresponding specific domain search space to the voice recognition server 500 (S207).

Therefore, the voice recognition server 500 creates the corresponding specific domain search space (S208) and transmits the created specific domain search space to the mobile terminal 400 (S209). In this case, the mobile terminal 400 may be configured to integratedly download the specific domain search space under wireless LAN environments such as WiFi, and the like for cost saving.

Thereafter, the mobile terminal 400 loads the downloaded specific domain search space to the memory (not illustrated) (S210) and performs the voice recognition for the voice recognition target word based on the general domain search space and the specific domain search space by receiving the voice recognition target word from the user (S211).

In FIGS. 4 and 5, an example of performing the charging and the loading for the specific domain selected by the user in order to perform the voice recognition based on the specific domain selected by the user is disclosed, but the present invention is not limited thereto and the specific domain may be stored regardless of charging or the selection by the user or the voice recognition may be performed immediately by using the specific domain search space which may be created and the general domain search space.

Hereinafter, referring to FIG. 6, the method of performing the voice recognition based on the general domain search space and the specific domain search space in FIGS. 4 and 5 will be described in detail.

Figure 6:
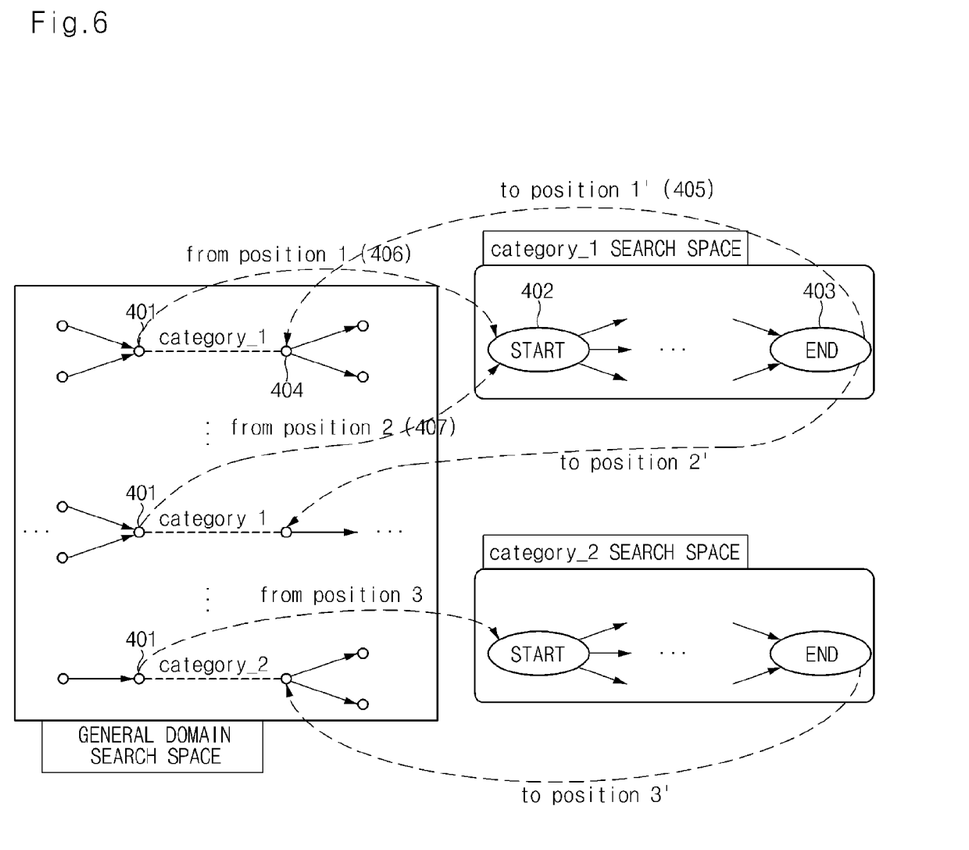
FIG. 6 is a diagram for describing a method for configuring a search space according to an exemplary embodiment of the present invention.

For example, when "the house which is good at cooking the Dombe meat which I like" is input as the voice recognition target word, if "the house which is good at cooking the Dombe meat which I like" is normally recognized, "I like" is recognized in the general domain search space and "the Dombe meat" is recognized in the specific domain search space and "the house which is good at cooking" at the end of the word is again recognized in the general domain search space and such a series of processes will be described with reference to FIG. 6. FIG. 6 is a diagram for describing a method for configuring a search space according to an exemplary embodiment of the present invention and is a conceptual diagram illustrating a process in which the voice recognition engines 210 and 430 search the search space during recognition.

When 'category_1' is met while decoding the general domain search space (401), the search space is transited to a first part of a search space for 'category_1' (402). When the end of the search space of 'category_1' is reached while decoding the search space (specific domain search space) of 'category_1' (403), the search space is transited to a transition point of the general domain search space (404). In this case, only information (specific domain search space transition information) called 'category_1' is present in the general domain search space and the specific domain search space has a search space (actual search space) for 'category_1'.

For example, when "the house which is good at cooking the Dombe meat like" is input, while "I like" is recognized in the general domain search space is normally recognized (401), the search space is moved to the specific domain search space when the part "Dombe meat" is recognized. In this case, "Dombe meat" is prestored in a category called "food (category_1). Therefore, when "Dombe meat" is to be recognized, the search space is moved to the first part of the "food" specific domain search space (category_1) (402). Thereafter, when the end point of the "food" specific domain search space is reached (403), the search space is transited to a transition point of the general domain search space again (404). Subsequently, "the house which is good at cooking" which is the next phrase is recognized in the general domain search space.

That is, when the transition information to the specific domain search space is reached during decoding the voice recognition target word in the general domain search space while transition information to the specific domain search space is included in the general domain search space, decoding is performed by moving to the specific domain search space corresponding to the transition information and when decoding is completed in the corresponding specific domain search space, the search space is transited to the general domain search space again.

When only a start point 402 of the specific domain search space and information 405 on the transition point to the general domain search space are separately managed at the time of coupling the general domain search space and the specific domain search space with each other as described above, the general domain search space and the specific domain search space are configured independently from each other. Accordingly, by only replacing the specific domain search space, different recognizer search spaces may be formed.

Recognition candidates transited to 'category_1' at different points of the general domain search space hold information associated with each point to prevent a collision from being occurred during recognition. That is, a recognition candidate 406 transited to 'category_1' at position 1 and a recognition candidate 407 transited to 'category_1' at position 2 contend with each other.

As described above, according to the present invention, in the voice recognition system, the search space is divided into the general domain search space and the specific domain search space and the specific domain search space is replaced to provide a differentiated voice recognition service for each specific domain.

That is, all contents are not contained in the general domain search space, but first transition information of a specific domain search space to which a word to be searched in the specific domain search space will be transited is stored in the specific domain search space and voice recognition is performed by moving the word to a designated specific domain search space, and as a result, the present invention is more advantageous in efficiency of the size than a case in which a single search space containing all contents is constructed in general. Therefore, the present invention may be implemented more advantageously in a mobile device having a limit in size thereof.

Figure 7:
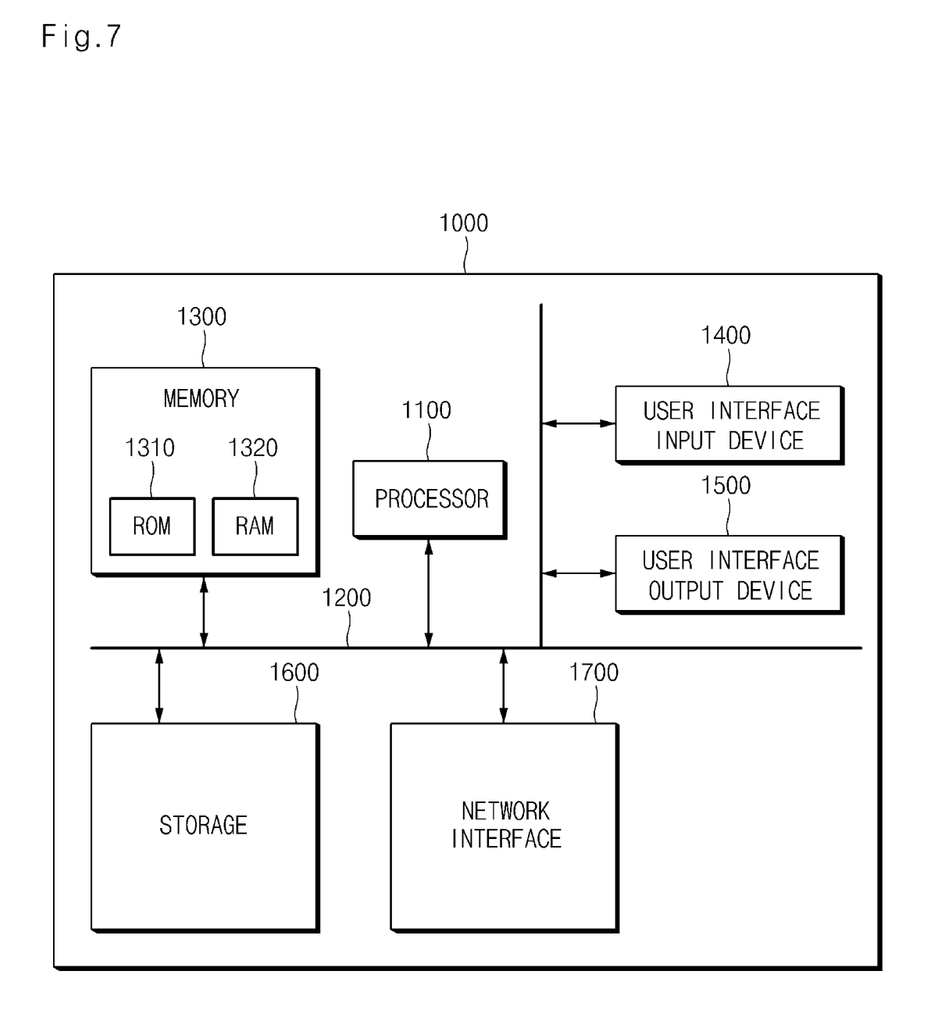
FIG. 7 is a configuration diagram of a computer system to which a voice recognition system of the present invention is applied.

FIG. 7 is a configuration diagram of a computer system to which the present invention is applied.

The computer system 1000 may include one or more processors 1100 connected through a bus 1200, a memory 1300, a user interface input device 1400, a user interface output device 1500, a storage 1600, and a network interface 1700.

The processors 1100 may be a central processing unit (CPU) or a semiconductor device that processes commands stored in the memory 1300 and/or the storage 1600. The memory 1300 and the storage 1600 may include various types of volatile or non-volatile storage media. For example, the memory 1300 may include a read only memory (ROM) and a random access memory (RAM).

Therefore, steps of a method or an algorithm described in association with the exemplary embodiments disclosed in the specification may be directly implemented by hardware and software modules executed by the processor 1100, or a combination thereof. The software module may reside in storage media (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in a user terminal. As yet another method, the processor and the storage medium may reside in the user terminal as individual components.

The present invention may be applied to even an automatic translation system as well as the voice recognition system.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

What is claimed is:

1. A voice recognition system, comprising:
    a mobile terminal receiving a voice recognition target word from a user; and
    a voice recognition server dividing a search space for voice recognition into a general domain search space and a specific domain search space and storing the spaces, and performing voice recognition for the voice recognition target word in link with the general domain search space and the specific domain search space,
    wherein the specific domain search space is selected by the user,
    wherein when a predetermined specific domain search space is selected by a user, the voice recognition server performs the voice recognition for the voice recognition target word through linkage of the selected specific domain search space and the general domain search space when the selected specific domain search space is present.

2. The system of claim 1, wherein the voice recognition server includes transition information to the specific domain search space in the general domain search space and decodes the voice recognition target word by moving to a specific domain search space corresponding to the transition information when the transition information to the specific domains search space is reached while decoding the voice recognition target word in the general domain search space.

3. The system of claim 1, wherein when a predetermined specific domain search space is selected by a user, the voice recognition server performs the voice recognition for the voice recognition target word based on the created specific domain search space and the general domain search space by creating the specific domain search space when the selected specific domain search space is not present.

4. The system of claim 1, wherein the voice recognition server includes:
    a general domain search space part creating and storing a general domain search space based on general knowledge information of which a category is not specified;
    a specific domain search space part creating and storing a specific domain search space based on knowledge information in a specific category; and
    a voice recognition engine performing the voice recognition for the voice recognition target word based on the general domain search space part and the specific domain search space part.

5. The system of claim 4, wherein the specific domain search space part includes:
    a specific domain knowledge database storing knowledge information for creating the specific domain search space;
    a specific domain search space creation module creating the specific domain search space by using the specific domain knowledge database; and
    a specific domain search space database storing the specific domain search space created by the specific domain search space creation module.

6. The system of claim 1, wherein the voice recognition server judges whether the specific domain search space is charged and when the specific domain search space is charged, the voice recognition server provides the specific domain search space to the mobile terminal.

7. The system of claim 6, further comprising:
    a charging server charging the specific domain search space by a request from the voice recognition server.

8. The system of claim 1, wherein the voice recognition server creates and stores a plurality of specific domain search spaces for each specific category, the plurality of specific domain search spaces shares types of categories, and contents in the category are configured to be different for each category of the plurality of specific domain search spaces.

9. A voice recognition system, comprising:
    a mobile terminal dividing a search space for voice recognition into a general domain search space and a specific domain search space and performing voice recognition for a voice recognition target word through linkage of the general domain search space and the specific domain search space; and
    a voice recognition server creating and storing the specific domain search space by a request from the mobile terminal,
    wherein the specific domain search space is selected by a user,
    wherein when a predetermined specific domain search space is selected by a user, the voice recognition server performs the voice recognition for the voice recognition target word through linkage of the selected specific domain search space and the general domain search space when the selected specific domain search space is present.

10. The system of claim 9, wherein the mobile terminal receives the voice recognition target word, and performs the voice recognition for the voice recognition target word based on the specific domain search space and the general domain search space when the specific domain search space is present and requests creating the specific domain search space to the voice recognition server to receive the created specific domain search space when the specific domain search space is not present.

11. The system of claim 10, wherein the mobile terminal includes:
a general domain search space database storing a general domain search space based on general knowledge information of which a category is not specified;
a specific domain search space database storing a specific domain search space based on knowledge information in a specific category; and
a voice recognition engine performing the voice recognition of the voice recognition target word through linkage of the general domain search space database and the specific domain search space database.

12. The system of claim 11, wherein the voice recognition server includes:
a general domain search space creation unit creating the general domain search space; and
a specific domain search space creation unit creating the specific domain search space.

13. The system of claim 10, wherein the mobile terminal judges whether the specific domain search space is charged and when the specific domain search space is charged, the mobile terminal loads the specific domain search space.

14. The system of claim 13, further comprising a charging server charging the specific domain search space by a request from the mobile terminal.

15. The system of claim 10, wherein the mobile terminal stores a plurality of specific domain search spaces, the plurality of specific domain search spaces shares types of categories, and contents in the category are configured to be different for each category of the plurality of specific domain search spaces.

16. A mobile device, comprising:
a general domain search space database storing a general domain search space based on general knowledge information of which a category is not specified;
a specific domain search space database storing a specific domain search space based on knowledge information in a specific category; and
a voice recognition engine performing the voice recognition of the voice recognition target word through linkage of the general domain search space database or the specific domain search space database,
wherein the specific domain search space database is selected by a user,
wherein when a predetermined specific domain search space database is selected by a user, the voice recognition engine performs the voice recognition for the voice recognition target word through linkage of the selected specific domain search space and the general domain search space when the selected specific domain search space is present.

17. A voice recognition method for replacing a specific domain, the method comprising:
dividing a search space for voice recognition into a general domain search space and a specific domain search space and storing the spaces;
receiving a voice recognition target word from a user; and
performing the voice recognition of the voice recognition target word based on the general domain search space and the specific domain search space,
wherein the performing the voice recognition of the voice recognition target word based on the general domain search space and the specific domain search space comprises
selecting, by a user, the specific domain search space; and
performing the voice recognition for the voice recognition target word through linkage of the selected specific domain search space and the general domain search space when the selected specific domain search space is present.

18. A voice recognition method for replacing a specific domain, the method comprising:
dividing a search space for voice recognition into a general domain search space and a specific domain search space and storing the spaces;
selecting, by a user, a specific domain search space;
judging whether the specific domain search space selected by the user is stored;
loading the specific domain search space selected by the user when the specific domain search space selected by the user is stored;
creating the specific domain search space when the specific domain search space selected by the user is not stored; and
performing voice recognition through linkage of the selected specific domain search space and the general domain search space.

19. The method of claim 18, wherein in the dividing of a search space for voice recognition into a general domain search space and a specific domain search space and the storing of the spaces,
transition information to the specific domain search space is included and stored in the general domain search space, and
in the performing of the voice recognition,
the voice recognition target word is decoded by moving to a specific domain search space corresponding to the transition information when the transition information to the specific domains search space is reached while decoding the voice recognition target word in the general domain search space.

20. The method of claim 18, further comprising:
after the selecting, by the user, of the specific domain search space,
judging whether the specific domain search space is charged,
wherein, in the judging of whether the specific domain search space is charged,
the specific domain search space is provided when the specific domain search space is charged.

* * * * *